UNITED STATES PATENT OFFICE.

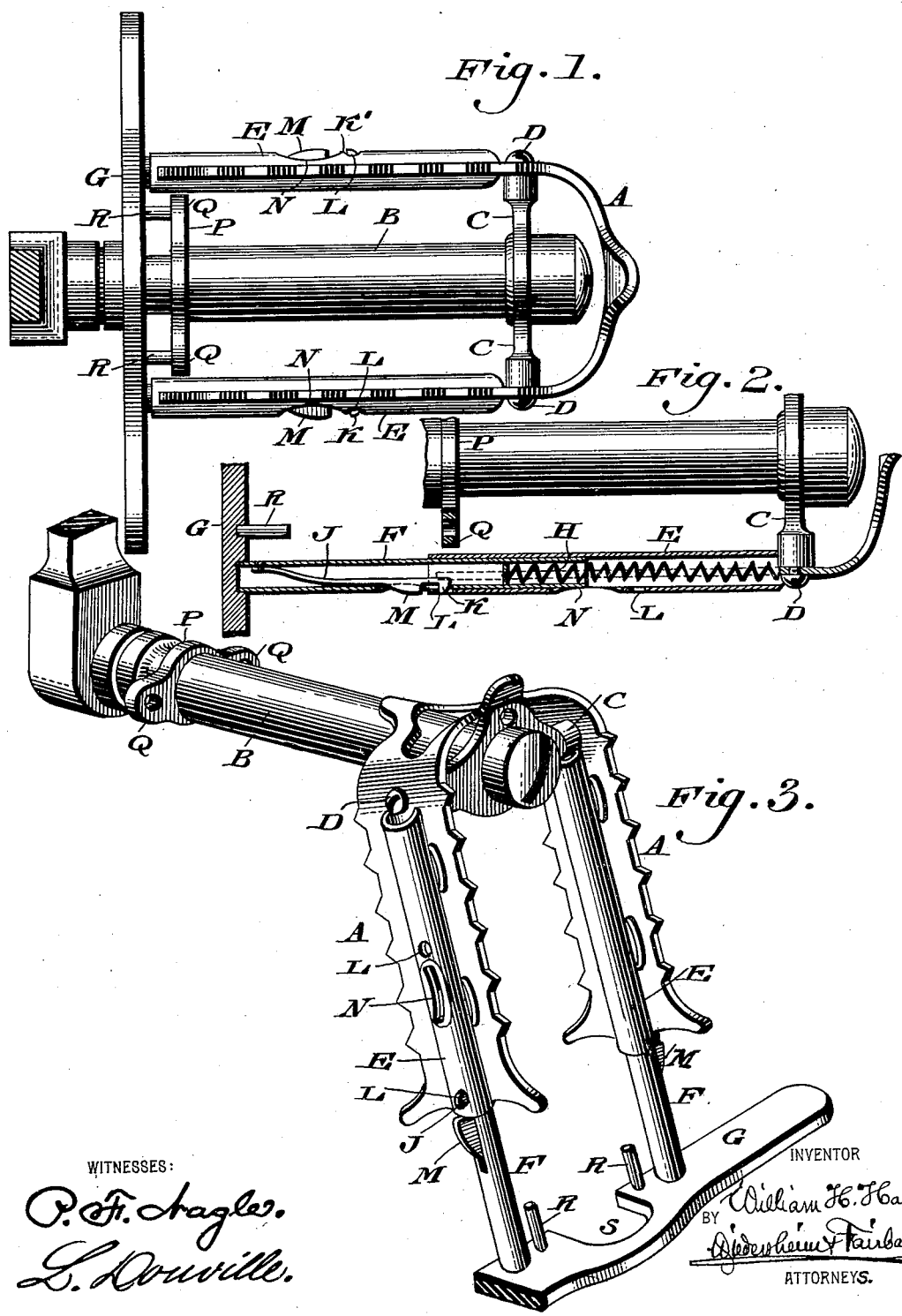

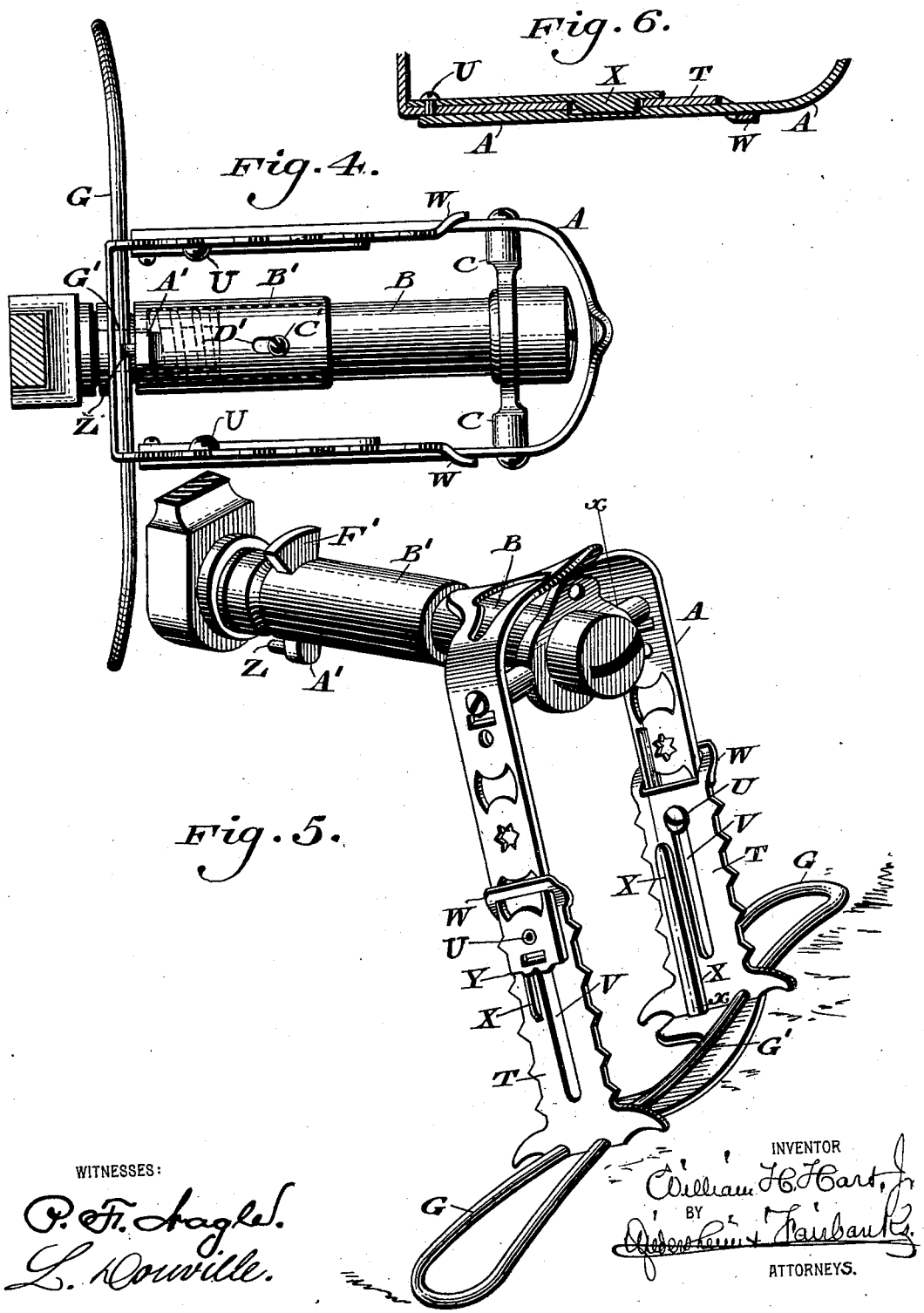

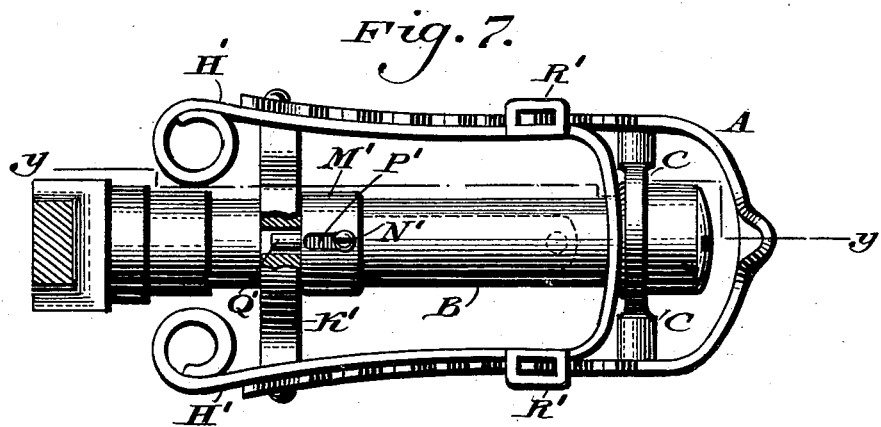
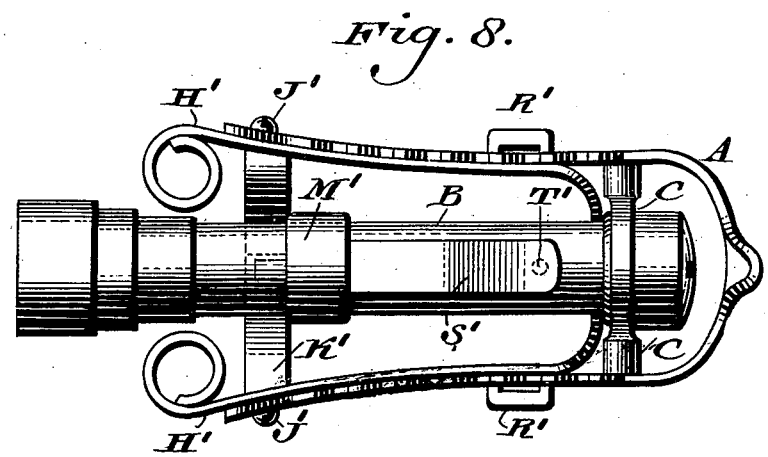
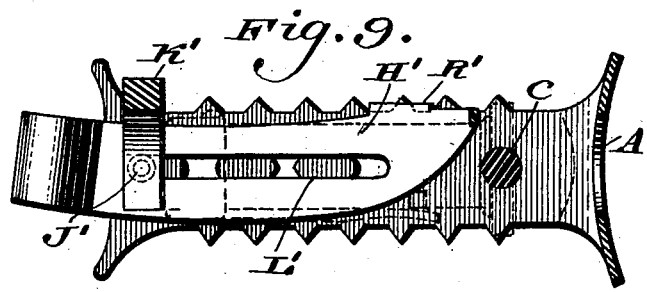

WILLIAM H. HART, JR., OF PHILADELPHIA, PENNSYLVANIA.

BICYCLE-SUPPORT.

SPECIFICATION forming part of Letters Patent No. 626,697, dated June 13, 1899.

Application filed April 25, 1898. Serial No. 678,694. (No model.)

*To all whom it may concern:*

Be it known that I, WILLIAM H. HART, Jr., a citizen of the United States, residing in the city and county of Philadelphia, State of Pennsylvania, have invented a new and useful Improvement in Bicycle-Supports, which improvement is fully set forth in the following specification and accompanying drawings.

My invention consists of the construction of a bicycle-pedal whereby it is adapted to be converted into a support for a bicycle and providing the same with means for extending the length of said pedal and locking the parts thereof, as will be hereinafter described.
It also consists of means for locking the pedal with the extension thereof when in operative and inoperative positions.

Figure 1 represents a top or plan view of a bicycle pedal and support embodying the same. Fig. 2 represents a partial plan view and partial horizontal section, some of the members being in a different position from that shown in Fig. 1. Fig. 3 represents a perspective view showing the pedal converted into a support. Fig. 4 represents a top view of another form of my invention. Fig. 5 represents a perspective view thereof. Fig. 6 represents a section of a portion on line $x\ x$, Fig. 5, the parts being in folded position.
Figs. 7 and 8 represent plan views of opposite faces of another form of the invention. Fig. 9 represents a horizontal section on line $y\ y$, Fig. 7.

Similar letters of reference indicate corresponding parts in the figures.

Referring to the drawings, A designates a bicycle-pedal, and B designates the sleeve of the crank-pin, on which the frame of said pedal is mounted by means of the arms C and the screws or pivots D, whereby said frame may be placed in the position shown in Fig. 1, as usual in pedals of the class, or thrown outwardly and downwardly, as shown in Fig. 3, as a bicycle-support. In the side pieces of the pedal are tubes or channels E, in which are telescopically received the bars or rods F, which form legs, to whose outer ends are secured the foot G, which is adapted to rest on the ground, floor, &c., as shown in Fig. 3, or rest in the sleeve B, as in Fig. 1. Within the tubes E, which are hollow or partly hollow, are springs H, whose tendency is to bear against the rods F and force out the same, as shown in Fig. 2. Connected with said rods are the spring catches or dogs J, whose noses K are adapted to enter either of the openings L in the tubes E, said openings being spaced relatively to the folded or unfolded positions of the foot G, so as to lock the rods F, and consequently said foot, in either of said positions. On the dogs, near the noses thereof, are the finger or thumb pieces M, which protrude through openings N in the tubes E, whereby said dogs may be pushed inwardly in order to release the noses from the openings they occupy when it is desired to move the rods F into or out of the tubes E.

On the inner end of the sleeve B is the cross-bar P, whose ends have openings therein forming the eyes Q, which are adapted to receive the studs or pins R, which project horizontally outwardly from the foot G for preventing the unfolding or opening out of the pedal-frame A, the parts now being in the position shown in Fig. 1, where it will be seen that the pedal-frame may be operated as usual in articles of the kind, the foot G being interlocked with the pedal as one. When, however, the dogs J are pressed in, the rods F are released, and owing to the springs H said rods, and consequently the foot, moves outwardly, as shown in Fig. 2, it being noticed that said foot is freely seated on the sleeve by means of the recess in the former, so that it slides on the sleeve, the studs or pins R then leaving the ears Q, when the pedal and the foot are disconnected from said sleeve. The pedal is now swung over outwardly and downwardly and the rods F drawn out to full extent, when the noses J drop into the openings L in the free end of the tubes E, when the foot is held locked in the distended position of said rods and the pedal is accordingly lengthened, the foot resting on the ground, road, floor, &c., and forming with the pedal an admirable support for the bicycle. When service of the support is not required, the dogs J are pressed in and the rods moved into the tubes to partial extent. The pedal-frame is then swung around and over, so that the foot rests on the sleeve and the frame assumes its normal position. The rods are now pushed into the tubes to full extent, when the foot is folded against the end of the frame and the pins R enter the eyes Q, the springs H being overcome. The noses of the dogs now engage the adjacent openings in the tubes, and thus lock the rods F, and consequently the foot G, so that the latter is practically in one piece with the pedal and follows the motions thereof.

In Figs. 4, 5, and 6 the tubes and rods of the prior figures are dispensed with and in lieu thereof I form the legs of flat plates T, which are fitted to the sides of the pedal by means of the screws U, which are connected with said sides and passed through slots V in said plates, and, furthermore, provide the inner ends of the plates with yokes W, which freely encircle the sides of the pedal, whereby the legs may freely slide on the pedal, while being firmly connected therewith. Connected with the legs are the springs, catches, or dogs X, which are adapted to engage with the free ends of the sides of the pedal-frame, as at Y, when the legs are distended to convert the pedal into a support. When the legs are folded on the pedal and the latter is overturned and placed on the sleeve B, it is locked by means of the pin or stud Z, which, engaging with the portion G' of the foot G, projects horizontally inward from the ear A' on the sliding collar B', the latter being mounted on the sleeve B and retained thereon by means of the screw C', which passes freely through the slot D' and is secured to said sleeve, said collar being pressed by the spring E', (shown in dotted lines, Fig. 4,) so that the pin or stud Z is in contact with the foot G and the release of the pedal is prevented.

In order to provide for the convenient operation of the collar B', the same has secured to or formed with it the finger or thumb piece F', the use of which is evident.

In Figs. 7, 8, and 9 the legs H' are connected with the frame of the pedal A by means of the screws J' on the cross-head K', said screw being passed through the side pieces of the frame, the slots L' in the legs H', and being secured to said cross-head K', thus connecting said parts and permitting the sliding of the legs on the pedal. On the sleeve B is the spring-pressed sliding collar M', which is retained thereon by the screw N', the latter passing freely through the slot P' in said collar and being secured to said sleeve. Projecting from the collar M' is the pin or stud Q', which enters the cross-head K' and locks the same and retains the pedal-frame on the sleeve in the normal position. (Shown in Fig. 1.) When the pedal is converted into a support, the legs having been extended from the pedal, said legs are prevented from spreading outwardly by means of the lips R', which engage with the adjacent edges of the side pieces of the frame. The collar M' has connected with it the spring-catch S', whose pin or nose T' is adapted to drop into an opening in the sleeve B, thus locking said collar. When, however, the catch is raised, the collar may be moved on the sleeve to disengage with the pin or stud Q' from the cross-bar K', whereby the pedal-frame is released and may be turned or swung for converting it into a support.

In either of these constructions the sleeve B is mounted on the wrist-pin of the crank as pedal-frames usually are.

Having thus described my invention, what I claim as new, and desire to secure by Letters Patent, is—

1. A bicycle pedal-frame pivotally connected with the rocking sleeve of a crank-pin and having a leg telescopically connected with it, whereby it may be converted into an extended support.

2. A bicycle pedal-frame pivotally connected with the rocking sleeve of a crank-pin, a sliding leg fitted to said frame, and a catch on either part for locking the leg with the frame.

3. A bicycle pedal-frame pivotally connected with the rocking sleeve of a crank-pin, a sliding leg fitted to said frame, and a catch for locking the leg with the frame and a catch for locking the frame on said sleeve.

4. A bicycle pedal-frame having a sliding leg fitted thereto whereby said frame may be converted into an extended support, and a catch for locking said leg with said frame in either its folded or unfolded position, said frame having recesses at different places to receive the nose of said catch.

5. A bicycle pedal-frame having a sliding leg fitted thereto whereby said frame may be converted into an extended support, and a catch for locking said leg with said frame in either its folded or unfolded position, said frame having recesses at different places to receive the nose of said catch, and the latter having a finger-piece for operating the same.

WILLIAM H. HART, JR.

Witnesses:
JOHN A. WIEDERSHEIM,
WM. C. WIEDERSHEIM.